United States Patent
Auger et al.

(10) Patent No.: US 9,256,600 B2
(45) Date of Patent: Feb. 9, 2016

(54) METHOD AND SYSTEM FOR ELECTRONIC CONTENT LOCKING

(75) Inventors: Jeremy Auger, Kitchener (CA); Brian Cepuran, Kitchener (CA)

(73) Assignee: D2L CORPORATION, Kitchener, Ontario (CA)

( * ) Notice: Subject to any disclaimer, the term of this patent is extended or adjusted under 35 U.S.C. 154(b) by 0 days.

(21) Appl. No.: 13/446,429

(22) Filed: Apr. 13, 2012

(65) Prior Publication Data

US 2013/0275401 A1   Oct. 17, 2013

(51) Int. Cl.
- *G06F 17/30* (2006.01)
- *G06F 21/10* (2013.01)
- *G06F 21/62* (2013.01)

(52) U.S. Cl.
CPC .......... *G06F 17/30011* (2013.01); *G06F 21/10* (2013.01); *G06F 21/6218* (2013.01)

(58) Field of Classification Search
None
See application file for complete search history.

(56) References Cited

U.S. PATENT DOCUMENTS

| | | | | |
|---|---|---|---|---|
| 5,761,659 | A * | 6/1998 | Bertoni | |
| 6,067,551 | A * | 5/2000 | Brown | G06Q 10/10 |
| 6,105,098 | A * | 8/2000 | Ninose et al. | 710/200 |
| 7,861,307 | B2 * | 12/2010 | Dionne | 726/26 |
| 8,024,361 | B2 * | 9/2011 | Daughtry | G06F 21/604 707/786 |
| 8,386,449 | B2 * | 2/2013 | Hartman | G06F 17/30306 707/704 |
| 8,429,753 | B2 * | 4/2013 | Skaria et al. | 726/27 |
| 2002/0184535 | A1 * | 12/2002 | Moaven | G06F 21/6218 726/17 |
| 2003/0093524 | A1 * | 5/2003 | Goldick | 709/225 |
| 2004/0230895 | A1 * | 11/2004 | Elza et al. | 715/511 |
| 2006/0101081 | A1 * | 5/2006 | Lin | G06F 17/30362 |
| 2006/0136926 | A1 * | 6/2006 | Goldick | G06F 9/52 718/104 |
| 2006/0155705 | A1 * | 7/2006 | Kamper | G06F 17/30067 |
| 2007/0185872 | A1 * | 8/2007 | Ho | G06F 9/526 |
| 2007/0233689 | A1 * | 10/2007 | Carpenter | G06F 17/3089 |
| 2008/0148369 | A1 * | 6/2008 | Aaron | G07C 9/00309 726/5 |
| 2008/0195615 | A1 * | 8/2008 | Rowley | G06F 17/30209 |
| 2009/0019048 | A1 * | 1/2009 | Pendergast et al. | 707/8 |
| 2009/0063488 | A1 * | 3/2009 | Daum | G06Q 10/00 |
| 2009/0106247 | A1 * | 4/2009 | Daughtry et al. | 707/8 |
| 2009/0282462 | A1 * | 11/2009 | Skaria et al. | 726/3 |
| 2009/0328041 | A1 * | 12/2009 | Sudzilouski | 718/100 |
| 2010/0281007 | A1 * | 11/2010 | Bailor et al. | 707/704 |
| 2011/0078246 | A1 * | 3/2011 | Dittmer-Roche | 709/205 |
| 2012/0089735 | A1 * | 4/2012 | Attaluri et al. | 709/226 |
| 2012/0284804 | A1 * | 11/2012 | Lindquist et al. | 726/29 |
| 2013/0047268 | A1 * | 2/2013 | Arat | 726/28 |

* cited by examiner

*Primary Examiner* — Hung Le

(74) *Attorney, Agent, or Firm* — Gowling Lafleur Henderson LLP; Neil Henderson

(57) ABSTRACT

A method for electronic content locking including: accessing electronic content and determining if the electronic content is currently locked for a first user. The method further determines meta-data relating to the electronic content and allows a second user to override the lock such that the electronic content is unlocked if the meta-data meet predetermined criteria. A system for electronic content locking having: an electronic content repository; and a locking controller adapted to change the status of electronic content in the electronic content repository between locked and unlocked. The system further includes a data collection module designed to retrieve meta-data relating to electronic content; and an override controller designed to override the locking controller and change the status of the locked electronic content from a first user to a second user.

20 Claims, 4 Drawing Sheets

METHOD AND SYSTEM FOR ELECTRONIC CONTENT LOCKING

FIELD

The present disclosure relates generally to electronic content locking. More particularly, the present disclosure relates to methods and systems for electronic content locking.

BACKGROUND

Document management or electronic content systems are becoming an important part of business today. These system aid in controlling access to documents and often include version control to ensure users are viewing and using the most current version of a document. Typically, if a user wants to edit a document in a document management system, the system or user will lock the document, which prevents other users from editing the document at the same time. Related document management systems may still allow other users to view a read-only copy of the document, or the last version of the document saved to the document management system when a first user has locked the document. If a second user wishes to edit the document, the second user may have to wait until the first user has unlocked or checked-in the document. However, if the first user has failed or forgotten to check-in the document, it may take a substantial amount of time, or may require involvement from an IT helpdesk or a super-user to unlock the document and may result in the changes made by the first user being lost.

It is, therefore, desirable to provide improved electronic content locking systems and methods.

The above information is presented as background information only to assist with an understanding of the present disclosure. No determination has been made, and no assertion is made, as to whether any of the above might be applicable as prior art with regard to the present disclosure.

SUMMARY

Generally there is provided electronic content locking systems and methods that allow multiple users to lock or unlock electronic content based partly on meta-data collected about the content. The users may lock or unlock the electronic content at their will and base the decision on the meta-data they are shown.

In a first aspect, the present disclosure provides a method for electronic content locking including: accessing electronic content; determining if the electronic content is currently locked for a first user; determining meta-data relating to the electronic content; and allowing a second user to override the lock such that the electronic content is unlocked if the meta-data meet predetermined criteria.

In some cases the method for electronic content further includes presenting the meta-data to the second user.

In some cases, overriding the lock of the electronic content entails the same second user unlocking and re-locking the content wherein the second user is not a super-user or administrator.

In some cases, overriding the lock for the electronic content comprises overriding the lock for a part of the electronic content. In some of these cases, overriding the lock for the part of the electronic content includes overriding the lock on a subset of the content and allowing the second user to edit that subset. In some cases, the remaining part of the electronic content remains locked for the first user.

In some cases, the meta-data comprises edits to the electronic content.

In some cases, the method provided includes notifying the first user that the second user has overridden the lock for the electronic content.

In some cases, the method provided includes saving a copy of the first user's edits prior to override the lock for the electronic content.

In some cases, instructions from the second user to override the lock for the electronic content are received via a network enabled device.

In further aspect, the present disclosure provides a system for electronic content locking having: an electronic content repository; a locking controller adapted to change the status of electronic content in the electronic content repository between locked and unlocked; a data collection module designed to retrieve meta-data relating to electronic content; and an override controller designed to override the locking controller and change the status of the locked electronic content from a first user to a second user.

In some cases, the system further includes a display component to present the meta-data to a user accessing the electronic content in locked status.

In some cases, the system includes an execution module adapted to divide the electronic content into parts and save the parts in the content repository. In some particular cases, the execution module resides on a network enabled device.

In some cases, the override controller is further designed to notify the first user if there is a change in status of the locked electronic content.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

DETAILED DESCRIPTION

Figure 1:
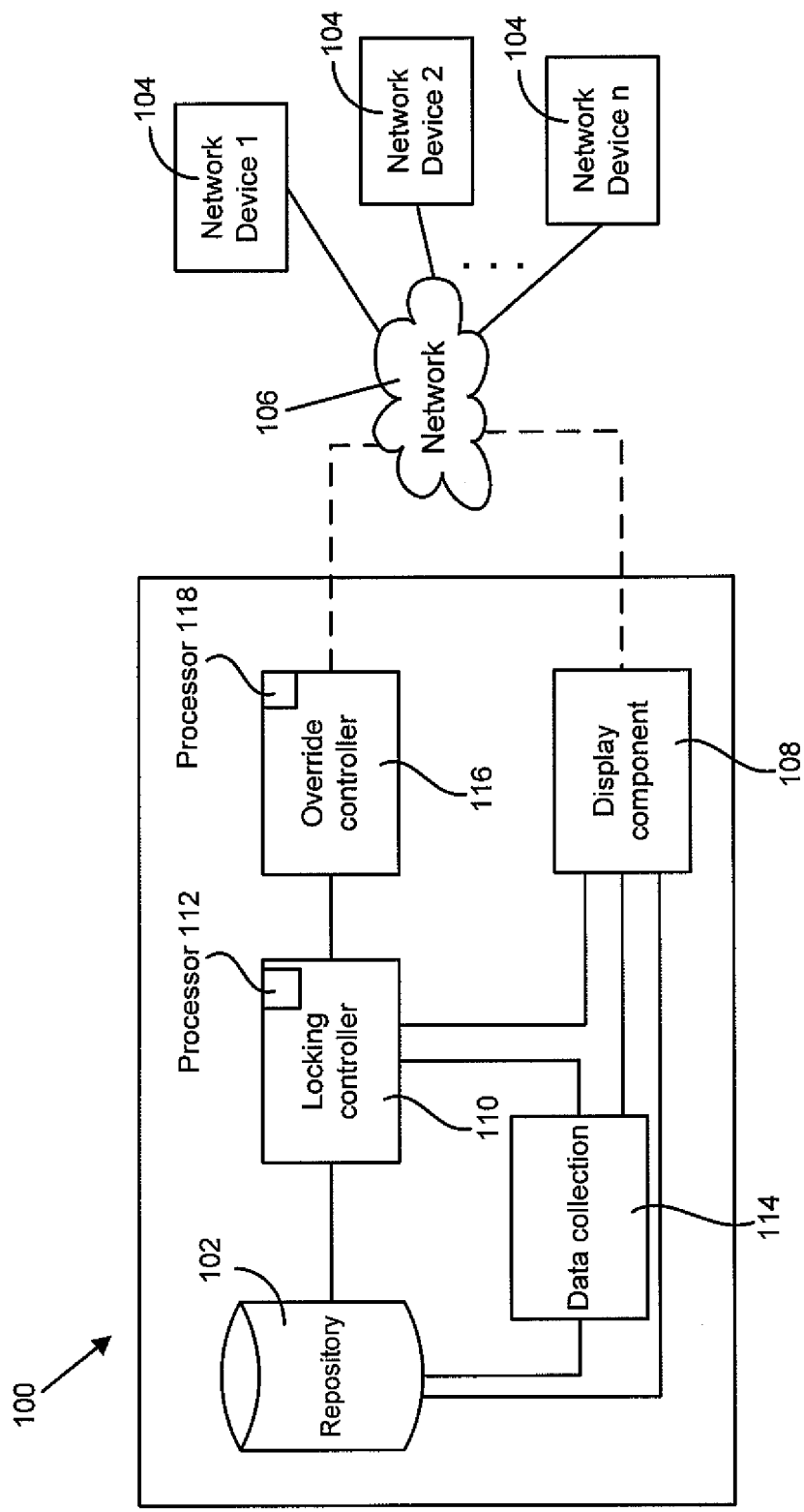
FIG. 1 illustrates some components of a system for electronic content locking.

Generally the present disclosure provides methods and systems for electronic content locking. In particular, the embodiments of the method and system described herein allow users to modify or transfer, for example unlock and re-lock, a lock on electronic content. In particular, a user may view data collected in relation to edits or changes made on the content by another user who locked the content. The term electronic content is used in a broad sense and is not limited to a traditional word processing or spreadsheet document. For example, the systems and methods described herein could be used with media content such as video, presentations, photos, sets or collections of multiple documents, and the like.

Related methods of controlling the ability of multiple people to edit a common document or file make use of forms of "check out" and "check in" functionality. These related methods effectively put a lock on the content so only the person who has "checked out" the content can edit it, and others are simply denied access to edit the content until the current editor, for example, the person that has checked out the content, "checks in" the content for others to use. Other related methods may not have locking but will proceed in a manner wherein the changes are applied in order of activity effectively allowing the last edits to govern the changes to the document.

The systems and methods described herein are intended to take a more open and collaborative approach. The systems and methods allow users unlock the electronic content then lock the content themselves, thus transferring the lock, in order to edit the electronic content, such as a document, page or section of a document, and apply this notion to the concept of content locking. The system, within the context of a collaboratively editable content locking, provides a "lock" button that functions more as a latch than a strict lock, allowing a second user (rather than merely a "super-user" or administrator of the system) to observe that the content is in locked status but giving the second user the ability to unlock and re-lock the content for himself/herself, in other words transfer the lock for the content, under predetermined circumstances. Upon actuating the lock, a server-side indicator would be set, along with the retrieval of meta-data indicating that the electronic content has been locked for editing, the time of the lock, and the user identification indentifying the user actuating the lock. The system may receive or retrieve meta-data with respect to the electronic content edits on an ongoing basis and update the meta-data in real time or on predetermined intervals, for example every second, every 5 seconds, every minute or other appropriate time interval. Further information could include other meta-data, for example:

- where the user is that made the change (for example, geo-location);
- amount of time spent editing the document;
- rate of change to document by the person (for example, how active is the editing); and/or
- credentials of the user (for example, identify the person as a frequent editor, regular editor, a professor/teacher, student or the like).

FIG. 1 illustrates an example embodiment of a system for electronic content locking 100. The system 100 includes a repository 102, which stores the electronic content that is accessible by various users' network enabled devices 104 through a network 106. The system may include a single or multiple repositories and may be distributed. The network 106 may be a local area network, wider area network or the Internet. Network enabled devices 104 such as computers, tablet computers, smart phones, etc. may access the repository through the network 104.

Once a user has made a request through a network enabled device 104 to view content stored within the repository 102, the repository 102 may relay the content to a display component 108, which graphically reproduces the content for the user on the network enabled device 104. The network enabled device 104 or display component 108 is further connected to a locking controller 110. The locking controller 110 indicates to the display component 108 whether the electronic content currently being requested is in a locked status by another user. In an alternative, the locking controller 110 may be accessed by the repository 102, to determine if the content is locked prior to the repository 102 transmitting the content to the display component 108.

In some cases, the locking controller 110 may further include a processor 112, which may be programmed to carry out the determination of whether specific electronic content is locked. The locking controller 110 may further include a storage or memory component (not shown) which may store the locked status of specific pieces of electronic content.

If the status of the content has been determined to be a locked status, meaning that the content is locked for a first user or that the first user has locked the content, a second user viewing the electronic content may wish to receive meta-data relating to the content, for example, further detail as to the changes to the electronic content, to information corresponding to the identity of the first user, to whether the lock is a stale lock or to whether the first user is currently editing the document. A data collection module 114 collects and stores meta-data relating to the changes of the electronic content currently in locked status. The data collection module 114 stores meta-data such as, for example, user information corresponding to the identity of the locked the content, when the content was locked, the last time changes were made to the content, the last time changes were saved, details about the changes made to the content, or other information that may be valuable when considering whether to unlock or transfer the lock for the content. The data collection module 114 may be connected to the display component 108 and the display component 108 may display the collected data on the second user's network enabled device 104 if the second user chooses to view the meta-data. In some cases, the system may have the first user's network enabled device 104 cache the meta-data locally and the system may either query the first user's network enabled device 104 at predetermined time intervals or on triggering events, such as another user accessing the content. In an alternative, the first user's network enabled device 104 may periodically send updates to the data collection module 114.

The locking controller 110 is further connected to an override controller 116. The override controller 116 may be engaged by the user viewing the document to override the current locked status of the electronic content. If the user chooses to override the current locked status, the override controller 116, which may include a processor 118, may override the status as determined by the locking controller 110. The override controller 116 may also be designed such that on an override of the locked status or alternatively on a request to override the locked status, the override controller may notify the editing or first user of the request to change the status of the content as further described herein.

Figure 2:
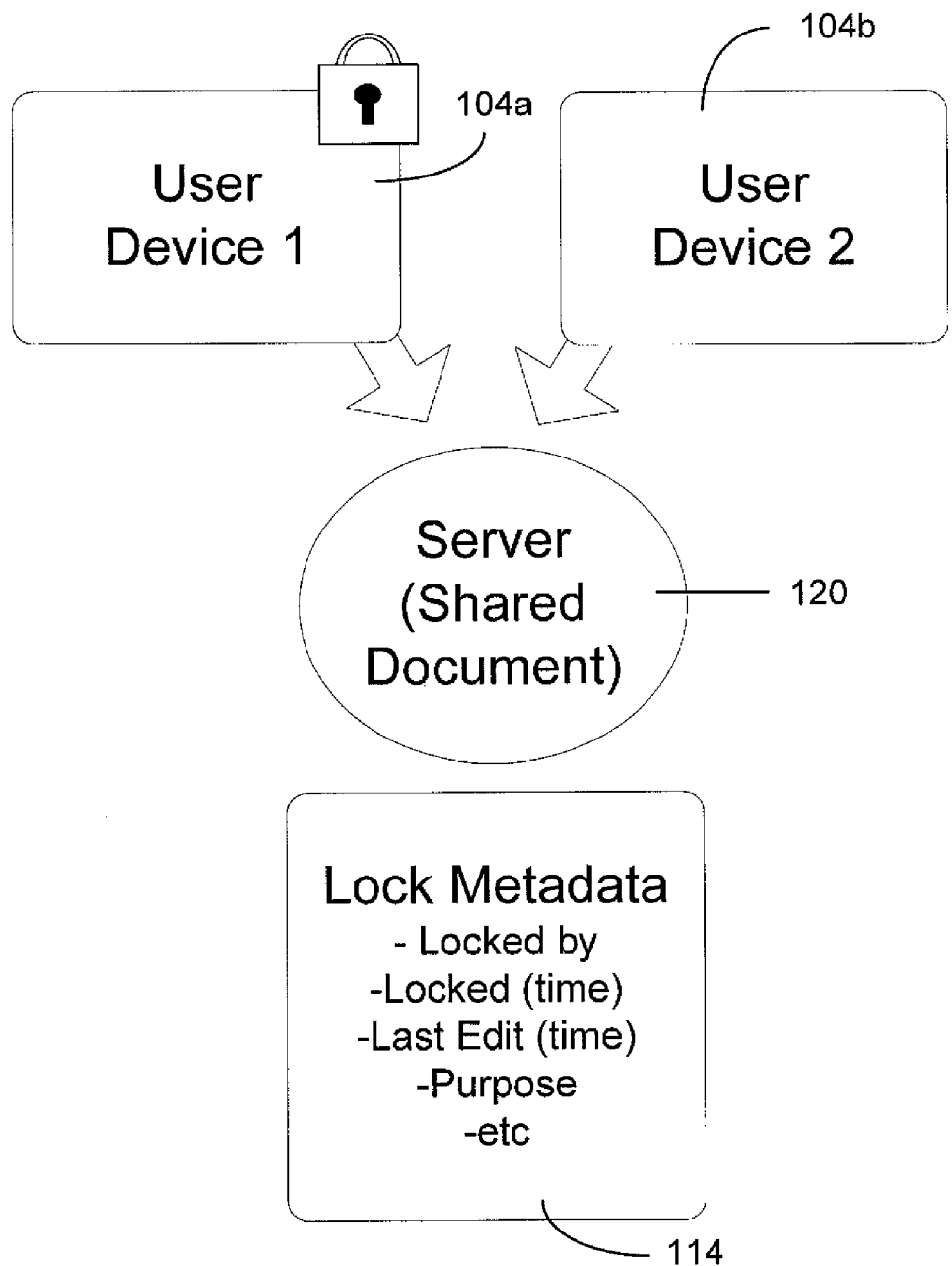
FIG. 2 illustrates an overview of users accessing the system.

FIG. 2 illustrates two user enabled devices 104a, 104b accessing a server 120 when the system for electronic content locking is in use. The first user, called the locking user, using network device 104a has accessed and locked a particular element of electronic content from the system for electronic content locking. When the second user, called the viewing user, using network device 104b accesses the same content, the second user would see an indicator of the current lock status (for example, a lock symbol or icon, text indicated the content is locked, a popup indicating that the content is locked, or the like). If the second user wishes, the second user may then access further data with respect to the locked content, such as meta-data provided by the system. The meta-data may include the name or account of the user who locked it, when the user locked the content (timestamp), and when the last change was entered or saved. This meta-data may be collected and stored in the data collection module 114. In an alternative, the data collection module 114 may access this information in real-time by querying the first user's device to determine information about the changes to the locked content. In some cases, the data collection module 114 may combine both real-time queried meta-data with the meta-data previously stored by the data collection module 114. In some cases, the meta-data may be collected at predetermined time intervals wherein the data collection module 114 queries the user's device and updates the meta-data accordingly.

In some cases, the second user may be free to override or turn off the lock at any time, and could use the timestamps and other meta-data as information to decide whether the content is being actively worked on, or whether the lock is a stale lock and can be removed. In other cases, the system may determine that the lock is a current lock as there have been edits within a pre-determined amount of time and not let the second user unlock the lock. In these cases there may be pre-determined system level settings which control whether or not the second user is given the option of unlocking the content. In yet other cases, the ability to unlock the document may be restricted to a particular user group, for example, a geographical-based lock, a hierarchical-based lock or a company-based lock, specific users within the geographical or hierarchical structure may be granted the ability to unlock the lock and proceed with editing the content. If the second user is not a member of the group, the second user may not be able to unlock the content. For example, users at a certain corporate level (for example, a director level) may unlock content while users under the corporate level (i.e., director level) may only be able to view locked content. In another example, users within North America may be able to unlock or override the lock, while users in other geographical locations may not be able to unlock the content.

If the second user is allowed to override the lock status, the second user may be given options as to how to proceed with overriding the lock status. Upon overriding the lock of the content that the first user had locked, the second user could be prompted with options, for example:

Preview the first user's changes, with options to:
   i. Commit all or a subset of the first user's changes; or
   ii. Discard all or a subset of the first user's changes;
Save a local copy of all or a subset of the first user's changes;
Save a network copy of all or a subset of the first user's changes, which may be saved under a different name or version number;
Email or otherwise notify first user a copy of their changes, but don't commit; and/or
Notify first user via email (or otherwise) that the lock has been broken.

It would be understood that a combination of the options may also be selected or performed by the system.

Additionally, the second user could request to the lock as compared to directly overriding it, in which case the first user would receive a request and decide to unlock the content for the second user perhaps including an option to either commit or discard the changes. The first user could receive an email or a real-time prompt informing the first user that a second user wishes to edit the content. In another alternative, the second user may set up a notification in order to be notified once the locking user has unlocked the content.

This system for locking electronic content could be used in conjunction with other version control features, such as version histories, reversion to old version, standard wiki functionality, etc.

Related lock management or document management systems and methods are typically strictly controlled by placing a lock on a document, and the lock can generally only be unlocked by that user or may have additional rights granted to a super user. In these related systems, while someone can typically see who locked the document, that is generally the extent of the information a second user has about the lock.

The present systems and methods are intended to be more open and use a collaborative approach to locking. The systems and methods are intended to provide more data, related to the edits made or currently being made to the content, or meta-data to make decisions about whether a lock is stale and give flexibility on what to do with any uncommitted changes if a user is interested in breaking a lock. The methods and systems take the approach that users will act based on the information provided to them, and on a voluntary basis whereas, related methods rely on an enforcement of locks controlled by the locking system.

Figure 3:
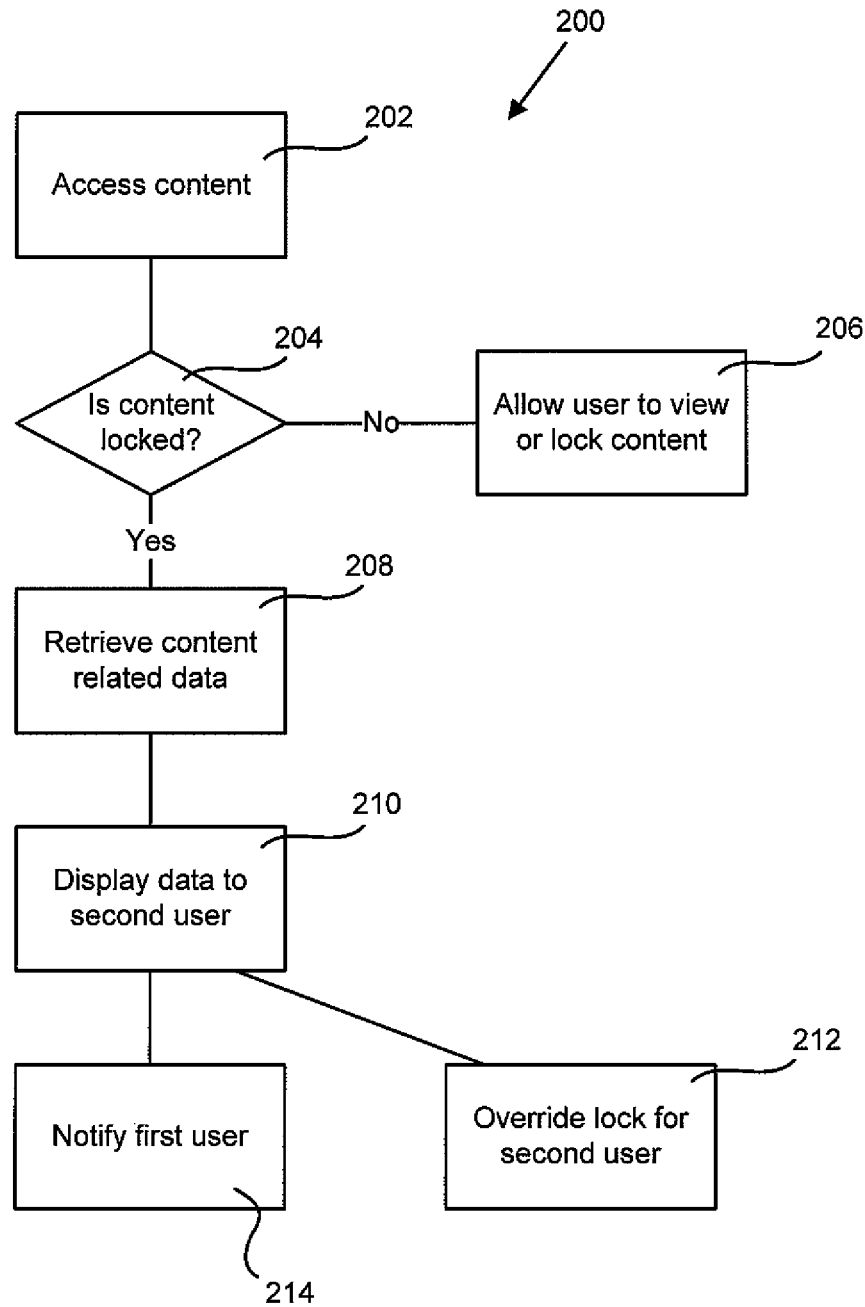
FIG. 3 is a flowchart of a method for electronic content locking.

FIG. 3 illustrates a method for electronic content locking 200. The method is initiated by a user accessing 202 electronic content stored within the system for locking electronic content. The locking controller of system will determine if the content is locked 204. If the content is not currently locked by another user, the system will allow the user to view or lock the content 206. In an alternative, the system may automatically lock the content when the user selects to view the content.

If the content has been locked, the content will be displayed 208 to the user, referred to as a second user or a viewing user, and will include a lock status indictor indicating the content is currently locked by another user. The second user may also be able to access, or may be able to retrieve 210 meta-data about the locked content. The second user can review the meta-data and determine if the lock is a stale lock in that the user who locked the content (the first user or locking user) has not edited or changed the content recently. The second user may also be shown the last time the content was edited, the current sections of the content that have been or are being edited or other data that may be beneficial for the user to review.

Once the second user has reviewed the meta-data, the second user may select to override the lock of the content 212 by unlocking the content then re-locking the content for himself or may select to notify 214 the first user requesting the right to edit the content. Once the content is unlocked, the second user may select to lock the content for editing or may leave the content unlocked. if the second user selects to lock the content, the meta-data and lock status will be updated as if the second user transferred the lock to himself.

In some cases, the second user may be unable to unlock the content. The system may automatically disallow the breaking of the lock if the system determines the content is currently being edited. The system may compare the last edit time to a predetermined threshold time. If the last edit time is within the threshold, then the system may block the second user from unlocking the document as the last edit time would indicate that the first user is currently editing the document. In an alterative, the system may query the network device to determine if an edit interface is displayed, indicating that the first user is currently editing the document. In some cases, the second user may request to be notified once the last edit time is outside the threshold and the second user will be able to unlock the content at that time. In another case, the system may determine whether the user is active within the system as a whole, for example, if the last edit was 10 seconds ago, but the user is currently not logged in, the system may determine that the lock has become a stale lock due to the user's inactivity. On the other hand, if the last edit was, for example, 10 minutes ago, but the user is active within the system, which could be indicative of the user doing research and may still be engaged in editing the document and the system may consider the lock to be an active lock.

In yet another case, the second user may be unable to unlock the content if the first user has included conditions with respect to the lock. For example, the first user may request a notification prior to a second user being able to unlock the content. In this example, the first user may be given a specific amount of time to acknowledge and respond to the notification before the system automatically unlocks the content. In other alternatives, the first user may respond to the notification and update the second user as to the expected length of time the first user requires to finish editing the content. In other alternative embodiments, the system may automatically send out a notification to a first user prior to allowing the content to be unlocked if the meta-data indicates active use of the content. Active use may be indicated by, for example, last edit time being below a predetermined threshold, last save time being below a predetermined threshold, or the like.

Figures 4A, 4B:
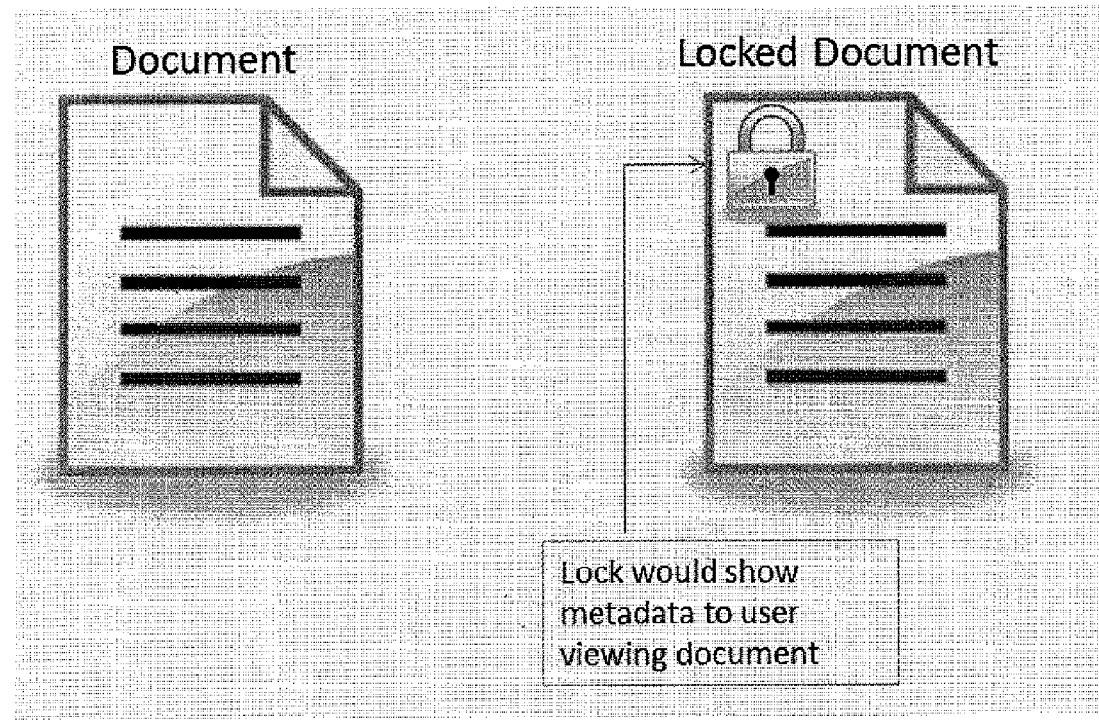
FIG. 4 illustrates possible display aspects of a locked document.

FIGS. 4A and 4B illustrate a document 300 that would be stored within the electronic content repository. The document would either be unlocked, as in FIG. 4A, and a user could lock the document and begin editing the content. FIG. 4B illustrates a document currently in locked status. In some cases, the user could click on the lock and would be shown associated meta-data, allowing the user the ability to make a decision on whether breaking the lock would conflict with another user's interactions with the document. For example, a last edit time was 10 seconds prior would indicate that the document is in use. However, last edit time of 2 days ago would likely indicate a forgotten lock.

In some cases, a second user may select to only unlock part of the locked electronic content. For example, in a text document, the second user may select to unlock only a specific page or paragraph that the user wishes to edit, allowing the locking user to continue to edit the remainder of the document. In a spreadsheet situation, the second user may unlock certain sheets, columns, or rows, while allowing the locking user to edit the remaining content. Allowing for the unlocking of only part of the content may allow multiple users to edit the same content at the same time, but maintains parameters to ensure that users are not editing the same portions of the content. The second user may be shown data as to what content the first user is currently editing, which is intended to ensure that the second user locks a part of the content that does not overlap the content currently being edited by the first user.

In an example, unlocking a part of the electronic content may be useful in a situation where multiple teachers or teacher assistants need to enter grades into a grading document. Each would be able to access the specific section as required but would not interfere with the others who may be entering their own grades into the same grading document at the same time. Further, the users would not have to wait for one user to release the document prior to adding their own input.

In another example, the system for electronic locking may be used in a video editing context. A first user may lock the video content for editing. A second user may select to unlock a chapter or a segment of the video while leaving the first user's lock with respect to the remainder of the data. In yet another example, the content might be a quiz or exam to be populated amongst a class of individuals. The quiz or exam may be a group exam where group members lock the questions, pages or parts of responses to essay questions to allow the group to tackle the overall exam more efficiently and allow group members to answer questions while yet other members are responding to other questions simultaneously.

For the system to partially unlock electronic content, an execution module may reside on the network device of a user of the system. The execution module may be linked between the operating system of the network device and the content editing programs used by the user. When a user wishes to create or save content, the execution module may be programmed such that the content is saved in parts. For example, a spreadsheet may be saved in rows, columns, or pages, a presentation may be saved by individual slides, etc. The parts are then combined to create a single content file which may be saved in the repository 102 of the system 100. In alternative embodiments, the execution module may reside on the system and once the repository receives new content, the execution module may review the content and break the content down into a plurality of parts.

When a first user is editing the content, the second user may partially unlock or transfer a partial lock of the content by retrieving specific parts of the content but the second user does not require the complete content. Once at least one of the users have completed editing the content, the execution module may amalgamate both users' changes in the various parts that were edited to re-create the single content file with the changes of the first and the second user. In another case, a second user may add new parts or sections to the content while allowing the first user to modify or edit components of the already existing content. The system may then apply the new content that was created by the second user to the existing content while the first user continues to edit the content or after the first user has saved the content.

In the preceding description, for purposes of explanation, numerous details are set forth in order to provide a thorough understanding of the embodiments. In some cases, the locking controller 110 and override controller 116 may be a single module and may include a single processor or may operate through a processor on the computer or server in which the system resides. Further, the repository 102 may reside outside the system and may be queried by the data collection through the server in which the system resides, or may be queried wireless, through a network or the like. However, it will be apparent to one skilled in the art that these specific details are not required. Specific details are not provided as to whether the embodiments described herein are implemented as a software routine, hardware circuit, firmware, or a combination thereof as such implementation will be understood by a person skilled in the art.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A method for electronic content locking comprising:
accessing electronic content;
determining if the electronic content is currently locked for a first user;
determining meta-data relating to the electronic content wherein at least a part of the meta-data relating to the electronic content is collected contemporaneously with editing by the first user, and wherein the meta-data relating to the electronic content comprises information relating to changes to electronic content by the first user while the electronic content is locked for the first user;
receiving a request to override the lock from a second user;
in response to receiving the request to override the lock,
providing, to the second user, a preview of changes to the electronic content made by the first user, wherein the preview of the changes are provided based at least in part on the meta-data relating to the electronic content; and
allowing the second user to override the lock such that the electronic content is unlocked if the meta-data relating to the electronic content meet predetermined criteria, wherein the second user is not within a predetermined group of users that has been previously authorized to unlock the electronic content.

2. The method for electronic content locking of claim 1 further comprising presenting at least part of the meta-data to the second user.

3. The method for electronic content locking of claim 1 wherein overriding the lock further comprises the same second user re-locking the content.

4. The method for electronic content locking of claim 1 wherein overriding the lock for the electronic content comprises overriding the lock for a part of the electronic content.

5. The method for electronic content locking of claim 4 wherein overriding the lock for the part of the electronic content comprises overriding the lock on a subset of the content and allowing the second user to edit that subset.

6. The method for electronic content locking of claim 4 wherein the remaining part of the electronic content remains locked for the first user.

7. The method for electronic content locking of claim 1 wherein the meta-data comprises edits to the electronic content.

8. The method for electronic content locking of claim 1 further comprising sending, to the first user, one or more of a notification of the requested to override the lock and a notification that the second user has overridden the lock for the electronic content.

9. The method for electronic content locking of claim 1 further comprising saving a copy of the first user's edits prior to override the lock for the electronic content.

10. The method for electronic content locking of claim 1 wherein instructions from the second user to override the lock for the electronic content are received via a network enabled device.

11. The method of claim 1 wherein the determining if the electronic content is currently locked for a first user comprises determining whether the first user has included conditions with respect to the lock.

12. The method of claim 11 wherein overriding the lock comprises determining if the conditions the first user has included with respect to the lock are satisfied.

13. The method of claim 1 wherein the second user not within a predetermined group of users is not a user within a predetermined administrator group or super-user group.

14. The method of claim 1, further comprising:
in response to receiving the request to override the lock, prompting the second user to select one or more of whether to commit at least a part of the changes, discard at least a part of the changes, whether to save a copy of at least a part of the changes, and whether to send the first user a copy of the changes.

15. A system for electronic content locking comprising:
one or more processors; and
one or more memories coupled with the one or more processors, wherein the one or more processors are configured to provide the one or more processors with instructions, which when executed, cause the one or more processors to:
access electronic content;
determine if the electronic content is currently locked for a first user;
determine meta-data relating to the electronic content, wherein at least a part of the meta-data relating to the electronic content is collected contemporaneously with editing by the first user, and wherein the meta-data relating to the electronic content comprises information relating to changes to electronic content by the first user while the electronic content is locked for the first user;
receive a request to override the lock from a second user;
in response to receiving the request to override the lock,
provide, to the second user, a preview of changes to the electronic content made by the first user, wherein the preview of the changes are provided based at least in part on the meta-data relating to the electronic content; and
allow the second user to override the lock such that the electronic content is unlocked if the meta-data relating to the electronic content meet predetermined criteria, wherein the second user is not within a predetermined group of users that has been previously authorized to unlock the electronic content.

16. The system for electronic content locking of claim 15, wherein the instructions, when executed, further cause the one or more processors to present at least part of the meta-data to the second user.

17. The system for electronic content locking of claim 15, wherein the instructions, when executed, further cause the one or more processors to divide the electronic content into parts and save the parts in the content repository.

18. The system for electronic content locking of claim 15 wherein the instructions, when executed, further cause the one or more processors to notify the first user if there is a change in status of the locked electronic content.

19. The system of claim 15, wherein the instructions, when executed, further cause the one or more processors to determine whether the first user has included conditions with respect to the lock.

20. The system of claim 19 wherein the instructions, when executed, further cause the one or more processors to determine if the conditions the first user has included with respect to the lock are satisfied.

* * * * *